UNITED STATES PATENT OFFICE.

EMIL FRIEDRICH SCHELLER, OF LORSBACH IN THE TAUNUS, GERMANY.

METHOD OF PRODUCING ACETALDEHYDE.

1,244,902.  Specification of Letters Patent.  Patented Oct. 30, 1917.

No Drawing.  Application filed June 26, 1917.  Serial No. 177,148.

*To all whom it may concern:*

Be it known that I, EMIL FRIEDRICH SCHELLER, a subject of the Emperor of Germany, and a resident of Lorsbach in the Taunus, Germany, have invented a new and useful Method of Producing Acetaldehyde, of which the following is a specification.

This invention relates to a method of producing acetaldehyde by acetylene and steam. In spite of the most careful removal of catalyzing poisons during a long period of manufacture a decrease of the efficiency of the catalyst has been proved. Now it was found, that the causes for this decrease can be attributed either to physical or to chemical influence. The small deposition of carbon on the catalyst is considered as physical cause in this sense and a partial reduction of higher oxids to lower degrees of oxids as the chemical influence. If the catalyst, when rendered inefficient, is treated at a high temperature with a gas containing oxygen, for instance air, the latter regains its original efficiency, provided, however, that strict care is taken to keep off catalyzing poisons. Hereby either the deposited carbon is burned or the metal oxids which are partially reduced to a lower degree of oxids are transformed to the original higher oxids. As already stated catalysts regenerated in this manner have regained their original efficiency and thereby the possibility is given to transform large quantities of acetylene to acetaldehyde by small quantities of metal oxids.

The result of thus restoring the exhausted catalysts to their original efficiency is proved by the following experiments:

In a suitable furnace a mixture of 400 vol. of steam and 15 vol. of carefully purified acetlylene is conducted through the tube heated to about 600° with a layer 35 cm. long of asbestos impregnated with molybdic acid. Care is to be taken that 1 l. of the mixture passes per minute per square centimeter transverse section. Then the yield of acetaldehyde is nearly 17%. When the trial is repeated under the same conditions the yield decreases to 12%, in repeating again to 8%, etc. By conducting a current of air at higher temperature through the tube the yield increases again to 17%. By this manner a complete regeneration is effected and with a certain quantity of catalyst unlimited quantities of acetaldehyde are produced.

What I claim is:

1. The method of regenerating the catalyst in the manufacture of acetaldehyde from acetylene, deprived of its catalytic poisons, and steam, consisting in treating the exhausted catalyst in the form of the oxid of a metal capable of combining directly with oxygen, at a high temperature with a current of gas containing oxygen.

2. The method of regenerating the catalyst in the manufacture of acetaldehyde from acetylene, deprived of its catalytic poisons, and steam, consisting in treating the exhausted catalyst in the form of the oxid of a metal, capable of combining directly with oxygen, at a high temperature with a current of air.

3. The method of regenerating the catalytic properties of molybdic acid for the manufacture of acetaldehyde from acetylene, deprived of its catalytic poisons, and steam, consisting in treating the exhausted molybdic acid at a high temperature with a current of air.

In testimony whereof I have signed my name to this specification in the presence of two subscribing witnesses.

EMIL FRIEDRICH SCHELLER.

Witnesses:
VALENTIN WEICKEL,
EMMY NOLL.